Patented Dec. 4, 1945

2,390,422

UNITED STATES PATENT OFFICE 2,390,422

METHOD OF PRODUCING A COATING COMPOSITION

Clarence M. Carson, Cuyahoga Falls, Ohio, assignor to Wingfoot Corporation, Akron, Ohio, a corporation of Delaware No Drawing. Application March 20, 1942, Serial No. 435,474

3 Claims. (Cl. 260—734)

This invention relates to the method of producing coating compositions from a rubber derivative. It relates more particularly to a coating composition containing a partially oxidized rubber derivative. The application is in part a continuation of my application Serial No. 311,945 filed December 30, 1939.

The rubber derivatives used in carrying out this invention are partially oxidized cyclized rubbers. These may be prepared by treating rubber with various condensing or cyclizing agents. For example, the halide of an amphoteric metal or chlorostannic acid or a combination of two or more reagents may be caused to react with rubber under controlled conditions to produce the desired rubber derivatives. Phosphorous oxychloride or boron fluoride may be used as the condensing agent. The rubber derivatives may be formed in the manner disclosed by Sebrell U. S. Patent #2,052,423 and Endres U. S. Patent #2,052,391.

The cyclized rubber used in carrying out the invention is partially oxidized. The cyclization may be carried out by treating a solution of milled rubber with a reagent, such as chlorostannic acid or tin tetrachloride. The reaction mixture is emulsified with water, and then by steam distilling the solvent from the emulsion thus produced the rubber derivative is precipitated. The dried product obtained in this way varies in chemical properties depending upon the extent of the cyclization, the temperature at which emulsification takes place, the chemical structure of the emulsifying agents and the pH value of the water. The product usually obtained by the use of tin tetrachloride and hydrochloric acid is a yellowish-white powder of a varying degree of particle size but containing a small proportion of material insoluble in coal tar solvents, such as toluol or in petroleum solvents, such as "rubber solvent" gasoline. Such solutions are clay-colored and cloudy in appearance due to suspended insoluble matter.

By the process of milling, i. e., by passing the powder of the rubber derivative repeatedly or continuously through steel rolls the powder is massed into a sheet which, when cooled, may be ground into particles the size of a small bean, dark brown to yellow in color. These particles are referred to herein as pellets. They are easily dispersed in cold toluol or gasoline giving a much clearer solution than the unmilled powder. When a solution of the unmilled material is applied to paper it is rough or gritty due to the insoluble matter in it. Milling the oxidized resin (the oxidized portion is really insoluble in all solvents) disperses the oxidized portion to such a degree that the solution is practically clear. However, on long standing (for example, three months) the oxidized portion will settle out. Whereas the unmilled powder in toluol forms a solution too viscous to be applied easily to a material, such as paper by a dipping or roller application, the milled material is of much lower viscosity and readily lends itself to such applications.

By varying the time of the cyclizing reaction or the amount of cyclizing reagents used, products having a range of distortion points from 5 to 125° C. have been prepared and marketed for various uses. The distortion point is determined as follows:

The dried reaction product in its unmilled or powdered state is molded by heat and pressure into a sheet ten inches square and one-eighth inch thick. From this sheet, strips one inch wide are cut. These are immersed in a water bath on two fulcrums one inch high and eight inches apart. The temperature of the water bath is raised 1° C. per minute. At each minute the strip of molded sheet is pushed down at the midpoint between the fulcrums until it touches the bottom of the bath. The pressure is immediately released. When the strip softens to the point where it does not return to its original straight position the temperature is noted, and this is called the distortion point.

The oxidized cyclized products used in carrying out this invention contain about 1 or 2 or 3% of oxygen. The oxidation may be effected in any one of several ways. For example, the reacted cement may be oxidized by passing oxygen through it. Chemicals, such as hydrogen peroxide, ammonium persulfate or chlorinated lime, etc., may be used to accelerate the oxidation. According to another method of oxidizing, the dried and milled rubber derivative, either in sheet form or as pellets preferably varying in size from that retained by a 10-mesh-per-inch screen to that which completely passes through a 2-mesh-per-inch screen, may be heated in air or oxygen gas under carefully controlled conditions.

For example, the substantially unoxidized products which are precipitated on distillation of solvent from the water emulsion, and which have distortion points of from 5 to 60° C., are milled. The resulting milled sheet is ground into pellets of a particle size of the order above indicated. The ground product is placed in trays one inch deep and heated from six to eighteen hours by circulating air at 175° F. over it. The length of time required for oxidation depends upon the softening point of the resin. The product is considered oxidized when it has increased in weight about 1 to 2%. The softer rubber derivatives oxidize more quickly and at a lower temperature than the harder derivatives. For instance, the rubber derivative with a distortion point of 15° C., can be oxidized in twelve hours at 150° F., whereas the derivative having a distortion point of 75° C. may require thirty-six hours at 175° F.

The granular oxidized product resulting from oxidation in a tray, as above described, is not entirely soluble in mineral spirits or other petroleum solvents. It is more nearly soluble in benzene, toluene and other coal tar solvents. By milling this oxidized product and grinding, a granular product is obtained which is quite dispersed in mineral spirits, benzene and toluol, and on dispersion therein, produces a practically clear solution or suspension.

To test the degree of oxidation the pellets are rolled or shaken in a bottle containing 20 parts of the pellets and 80 parts of toluol for sixteen hours. The presence of some insoluble lumps indicates that oxidation is sufficient.

According to another method of oxidation 5% of chlorinated lime, $Ca(OCl)Cl$, the bleaching powder of commerce, is milled into 95% of the milled cyclized product with a distortion point of 100–125° C. The milling time is approximately fifteen minutes, oxidation taking place on the mill. The product is soluble in gasoline or coal tar solvents. The value of the product is shown in its use as a moisture-vapor-proof coating for labels on food packages. The unoxidized Pliolite, applied over heavily inked labels and dried in an oven for forty-five seconds at 150° F. has poor adhesion. By the oxidation process described above, the adhesion is very much improved.

The oxidation occurs largely on the surface of the pellets. Uniformity of the product is obtained by later milling the pellets to uniformly disperse the oxidized material throughout the whole body of the material. An antioxidant may be milled into the rubber derivative at this point. The resulting milled sheet is then allowed to cool and is then ground.

The oxidized product may be dispersed in various solvents, such as toluol, gasoline, hydrogenated gasoline, benzol, carbon tetrachloride and various mixtures of the above or similar solvents. The solution viscosity is relatively high. By milling the oxidized rubber derivative and thereby dispersing the outer oxidized shell of each particle throughout the balance of the rubber derivative, a more easily soluble and lower viscosity product is obtained. If an antioxidant is to be used with the rubber derivative, it may be dissolved or dispersed in the solvent together with the rubber derivative.

It has been found that the oxidized material has greater adherence to certain types of surfaces than the unoxidized material. When the unoxidized material, in admixture with wax, for example, is coated onto nitrocellulose film, aluminum foil or glassine paper or the like, and two portions of the coated sheet are united by heat-sealing, as in the formation of a package, the seams will be weak. On breaking or tearing the seal the coating will show poor anchorage to the base material and weak strength in itself. However, if the resin is oxidized to the proper degree for the particular base material, the anchorage will be improved, and the strength of the seal will be much better. This improvement in adherence is noticed in coating the following materials, which are listed in the order in which the improvement is most noticeable: nitrocellulose, aluminum foil, oxidized inks (as on labels which have been printed for several weeks, particularly black and blue inks), polyvinyl alcohol sheet, cellulose acetate sheet, calendered kraft paper, rubber hydrochloride film, uncoated regenerated cellulose (Cellophane), glassine, ethyl cellulose foil, casein sheet, bond or book paper, parchment and other rough-surfaced papers.

The oxidized products when coated on paper or any of the above-mentioned sheets may lose their moisture resistance, their flexibility and their ability to heat-seal at low temperatures, and they may take on undesirable characteristics if exposed to ultra-violet light. The presence of oxidation inhibitors prevents or tends to prevent any change taking place in the product on aging. The best oxidation inhibitors are not those commonly used in the rubber industry, but rather those which have been found to be the best for prevention of gum formation in gasoline. However, the secondary aliphatic amines and the water insoluble derivatives of hydroquinone also have been found to prevent rapid aging. Some representative inhibitors are:

Aromatic and heterocyclic bases:
    o-Amino diphenyl
    p-Amino diphenyl
    Diamino diphenyl methane
    p-Phenylene diamine
    p-Amino dimethyl aniline
    o-Toluidine
    Benzamide
    n-n' Di(o-methyl cyclohexyl)-piperazine
Secondary aromatic amines:
    Diphenyl-p-phenylenediamine
    Phenyl-o-tolyl-phenylenediamine
    p-Hydroxy diphenyl amine
Aminophenols:
    o-Aminophenol
    p-Aminophenol
    Mono-benzyl-p-aminophenol
    2-Amino-5-hydroxytoluene
Phenols, naphthols and ethers:
    Butyl hydroquinone
    Pyrocatechol
    Alpha-naphthol
    Hydroquinone-monobenzyl ether ("Agerite Alba")
    Veratrole
    Diamyl hydroquinone Various plasticizers or modifiers may be added, such as:

(a) Oils:
    Linseed, palm, soy bean, perilla, tung, castor, castor derivatives, mineral, oleic acid, Neville oil, bodied tung oil, heat treated tung oil, vegetable oil acids, and animal oil acids.
(b) Waxes:
    Paraffin, ceresin, candelilla, beeswax, carnauba, Japan, spermaceti, Halowax 1014, octyl alcohol, cetyl alcohol, Opal wax, solid wax alcohols, hydrogenated fatty acids, toluol soluble soaps, (glyceryl monostearate).
(c) Gums and resins:
    Ester, cumar, dammar, copal, purified dammar residue.

(d) Synthetics:
  Vinylite, Neville resin, Aroclor, AWII, RH-35, Petrex 59–71, Petrex-all, Beckacite, Beckasol, Berex, sucrose octa-acetate, Vistanex-all, Amberol ST-137, triphenyl phosphate, Santicizers, vinyl acetate (Gelva resin).

(e) Liquid plasticizers:
  Tricresyl phosphate, dibutyl phthalate, amyl stearate, Hercolyn, Abalyn, glyceryl butyl phthalate, glyceryl abietate, diamyl naphthalene, mono-amyl naphthalene, ethyl lactate, butyl stearate, ethylene glycol, tributyl citrate, dibutyl sebacate, Cardolite, lauryl alcohol.

Plasticizers which have oxidation-inhibiting value include glycerol mono stearate, 2:7 hydroxy naphthalene and amino stearin.

The modifiers or plasticizers may advantageously be milled into the rubber derivative before the rubber derivative is subjected to oxidation. Phenolics, such as Durez, Beckacites and other phenol aldehyde resins improve the gloss on the coated sheet. By dissolving the rubber derivative, paraffin, the cyclohexanone resin (which may be resin AWII) and the other above ingredients in gasoline, a coating for glassine paper, cellulose acetate sheet and the like is obtained. These sheets may be coated by being dipped in the solution, and then passing over suitable scrapers, rods or doctor rolls to obtain the desired thickness of coating.

It is advisable to control the oxidation of the rubber derivative by the use of oxidation inhibitors or antioxidants. From one to four per cent of anti-oxidant may be milled into the oxidized cyclized rubber, thus preventing further oxidation on storage or after coating, or the anti-oxidant may be separately added to the coating composition.

For example, it is advantageous to oxidize the cyclized rubber, which has a 50–60° C. distortion point, in the preparation of compositions which are to be applied to glassine paper in packaging foods. It is advantageous to partially oxidize the rubber derivative when it is to be used as labels for tin or cardboard cans, packed for shipment in cartons or boxes, because the oxidized product will not scuff or become defaced as readily as the unoxidized product when the packages rub together during shipment. The unoxidized rubber derivative has relatively poor adherence to nitrocellulose coated foil or to nitrocellulose-coated paper. However, if it is oxidized prior to being compounded into a coating or adhesive for adherence to nitrocellulose, the adhesion will be improved.

The following examples illustrate the invention:

*Example 1.—Coating for cellulose acetate*

|   | Parts |
|---|---|
| Oxidized rubber derivative | 15.0 |
| Paraffin 134° S. P. | 1.5 |
| Gum dammar | 1.5 |
| Diamyl naphthalene | 1.4 |
| "Vanox" | .6 |
| Toluol | 80.0 |
|   | 100.0 |

"Vanox" consists of .5 of pyrogallol, 0.25 part hydroquinone and 0.25 part triethanolamine. This gives a satisfactory coating for cellulose acetate which retains its resistance to moisture-vapor transmission and its heat-sealing properties for a prolonged period.

*Example 2.—Pliolite paper coating*

|   | Parts |
|---|---|
| Oxidized rubber derivative | 15.8 |
| Paraffin wax (120° S. P.) | 1.8 |
| Cyclohexanone resin | 1.4 |
| Diamyl naphthalene | 0.8 |
| "Vanox" | 0.2 |
| Solvent | 80.0 |
|   | 100.0 |

By dissolving the Pliolite, paraffin, cyclohexanone resin (which may be Resin AWII) and the other above ingredients in toluol or gasoline, a coating for glassine paper, cellulose acetate sheet and the like is obtained. These sheets may be coated by being dipped in the solution.

*Example 3.—Coating for metal foil*

|   | Parts |
|---|---|
| Oxidized rubber derivative | 15.0 |
| Paraffin 148–50° F. | 1.5 |
| n-n'-di(methylcyclohexyl) piperazine | 0.6 |
| Rubber solvent gasoline | 82.9 |
|   | 100.0 |

*Example 4.—Modified coating for regenerated cellulose and for cellulose acetate*

|   | Parts |
|---|---|
| Oxidized rubber derivative | 15.0 |
| Gum dammar | 1.5 |
| Paraffin (148–50° F.) | 1.5 |
| Mono-benzyl-p-amino phenol | 0.3 |
| Toluol | 81.7 |
|   | 100.0 |

What I claim is:

1. The process of producing a coating composition which comprises oxidizing the surface of a pellet of finely divided particles of a cyclized rubber, milling the oxidized pellet and an anti-oxidant and dispersing the milled product in a solvent.

2. The method of producing a coating composition which comprises oxidizing the surface of a pellet composed of finely divided particles of a cyclized rubber, milling the pellets to disperse the oxidized material throughout the mass and then dissolving the milled product and an antioxidant in a solvent.

3. In the method of producing a coating composition from a cyclized rubber obtained by precipitating the cyclized rubber from an emulsion in water of a solution thereof by vaporization of the solvent from the solution, the steps which comprise agglomerating the precipitated particles by milling into a sheet, subdividing the sheet to produce pellets about the size of a small bean, and then oxidizing these so as to increase their weight about 1 to 2 per cent, then grinding the pellets to blend the oxidized surface with the balance thereof, and then dissolving the resulting product in a solvent.

CLARENCE M. CARSON.